United States Patent [19]
Tomita et al.

[11] Patent Number: 6,100,884
[45] Date of Patent: *Aug. 8, 2000

[54] DEVICE FOR DELIVERING LISTINGS OF BROADCAST PROGRAMS VIA NETWORK

[75] Inventors: Yasumasa Tomita; Shigeru Oizumi, both of Kawasaki, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/827,717

[22] Filed: Apr. 8, 1997

[30] Foreign Application Priority Data

May 27, 1996 [JP] Japan .................................. 8-131724

[51] Int. Cl.$^7$ .................................................. G06K 15/00
[52] U.S. Cl. ........................................... 345/327; 345/354
[58] Field of Search ..................................... 345/327, 326, 345/728, 340, 329–339, 341–350, 200, 352–355, 356, 357; 358/335; 348/569

[56] References Cited

U.S. PATENT DOCUMENTS

| | | | |
|---|---|---|---|
| 4,567,512 | 1/1986 | Abraham ................................... | 358/86 |
| 4,706,121 | 11/1987 | Young ....................................... | 358/142 |
| 5,014,125 | 5/1991 | Pocock et al. ............................. | 358/86 |
| 5,151,789 | 9/1992 | Young .................................... | 358/194.1 |
| 5,353,121 | 10/1994 | Young et al. ............................ | 358/188 |
| 5,465,385 | 11/1995 | Ohga et al. ................................ | 455/61 |
| 5,479,266 | 12/1995 | Young et al. ............................ | 358/335 |
| 5,479,268 | 12/1995 | Young et al. ............................ | 358/335 |
| 5,491,760 | 2/1996 | Withgott et al. ......................... | 382/203 |
| 5,532,754 | 7/1996 | Young et al. ............................ | 348/569 |
| 5,585,838 | 12/1996 | Lawler et al. ............................ | 348/13 |

(List continued on next page.)

FOREIGN PATENT DOCUMENTS

| | | |
|---|---|---|
| 5-022672 | 1/1993 | Japan . |
| 5-022673 | 1/1993 | Japan . |
| 5-083688 | 4/1993 | Japan . |
| 5-284478 | 10/1993 | Japan ................................. H04N 7/08 |
| 5-284480 | 10/1993 | Japan ................................. H04N 7/08 |
| 5-284481 | 10/1993 | Japan ................................. H04N 7/08 |
| 6-030411 | 2/1994 | Japan ............................. H04N 7/173 |
| 7-147657 | 6/1995 | Japan ........................... G06F 15/403 |
| 7-1937520 | 7/1995 | Japan ................................. H04N 7/08 |
| 7-193762 | 7/1995 | Japan ............................. H04N 5/445 |
| 8-036605 | 2/1996 | Japan ............................... G06F 15/21 |

OTHER PUBLICATIONS

U.S. application No. 08/755,763, Okawa et al., filed Nov. 21, 1996.

U.S. application No. 08/840155, Tomita et al., filed Apr. 11, 1997.

U.S. application No. 08/838922, Tomita et al., filed Apr. 11, 1997.

*Primary Examiner*—Steven Sax
*Attorney, Agent, or Firm*—Staas & Halsey, LLP

[57] ABSTRACT

A device is provided for sending listings of broadcast programs to a plurality of terminal devices connected via a network so that the plurality of terminal devices display the listings of broadcast programs on display screens. The device includes a program-management unit for keeping information about broadcast programs of a plurality of broadcast stations in a random-list format, a generation unit for extracting information from the program-management unit with respect to broadcast programs of a date and time indicated by one of the terminal devices, and for editing extracted information to generate a listing of broadcast programs, and an addition unit for attaching at least one of a date change button, a time change button, and a search button to the listing of broadcast programs. The date change button and the time change button are used for changing a date and a time slot of a displayed listing of broadcast programs, respectively. The search button is used for displaying a listing of searched broadcast programs. A sending unit sends the listing of broadcast programs including at least one of the date change button, the time change button, and the search button to one of the terminal devices.

23 Claims, 20 Drawing Sheets

U.S. PATENT DOCUMENTS

| | | | |
|---|---|---|---|
| 5,592,551 | 1/1997 | Lett et al. | 380/20 |
| 5,619,249 | 4/1997 | Billock et al. | 348/7 |
| 5,623,613 | 4/1997 | Rowe et al. | 395/353 |
| 5,657,072 | 8/1997 | Aristides et al. | 348/13 |
| 5,671,411 | 9/1997 | Watts et al. | 395/615 |
| 5,686,954 | 11/1997 | Yoshinobu et al. | 348/13 |
| 5,699,107 | 12/1997 | Lawler et al. | 348/13 |
| 5,701,451 | 12/1997 | Rogers et al. | 395/600 |
| 5,721,827 | 2/1998 | Logan et al. | 395/200.47 |
| 5,732,216 | 3/1998 | Logan et al. | 395/200.33 |
| 5,748,493 | 5/1998 | Lightfoot et al. | 364/519 |
| 5,751,282 | 5/1998 | Girard et al. | 345/327 |
| 5,761,606 | 6/1998 | Wolzien | 455/6.2 |
| 5,774,664 | 6/1998 | Hidary et al. | 395/200.48 |
| 5,778,181 | 7/1998 | Hidary et al. | 345/200.48 |
| 5,790,172 | 8/1998 | Imanaka | 348/7 |
| 5,797,001 | 8/1998 | Augenbraun et al. | 395/609 |
| 5,818,438 | 10/1998 | Howe et al. | 345/327 |
| 5,822,539 | 10/1998 | van Hoff | 395/200.66 |
| 5,828,403 | 10/1998 | DeRodeff et al. | 348/7 |
| 5,835,843 | 11/1998 | Haddad | 455/4.2 |
| 5,880,768 | 3/1999 | Lemmons et al. | 348/1 |
| 5,914,712 | 6/1999 | Sartain et al. | 345/327 |
| 5,945,987 | 8/1999 | Dunn | 345/327 |

FIG.1
PRIOR ART

| WEEKLY LISTING OF PROGRAMS IN APRIL ||||||||
|---|---|---|---|---|---|---|---|
|  | MON. | TUES. | WEDS. | THURS. | FRI. | SAT. | SUN. |
| 17:00 | x x x x x x x |||| | x x x | x x x |
|  | |||| | x x x | x x x |
| 18:00 | x x x x |||| | x x x | x x x |
| 19:00 | x x<br>x x | x x x<br>x x x | x x<br>x x | x x x x<br>x x x x | x x x<br>x x x<br>x x x | x x x<br>x x x | x x x<br>x x x |
| 20:00 | x x | x x | x x | x x x x |  | x x x | x x x |
| 21:00 | x x<br>x x<br>x x | x x | x x | x x x x | x x x | x x x | x x x |
| 22:00 | | x x<br>x x | x x | x x x x<br>x x x x | x x x<br>x x x | x x x | x x x<br>x x x |
|  | | | | | | x x x | |
| 23:00 | x x x x x x x x<br>x x x x x x x x |||| x x x<br>x x x | x x x | x x x<br>x x x |
|  | | | | | x x x | x x x | x x x |

300 — BRADCAST-PROGRAM-INFORMATION SUPPLYING PROGRAM

301 — DATA-EXCHANGE UNIT

1996/04/11, NNK, 14:00, 14:35, DRAMA
[BILINGUAL] [CAPTION] Ms. REIKO'S DENTIST [RE-RUN] ⏎
．
．
．
．
．

FIG.10

PROFILE MANAGEMENT

| CHANNEL SETTINGS | OTHER SETTINGS |
|---|---|
| 1 NNK (1 ch)<br>2 NNK EDUCATION (3 ch)<br>3 EAST-WEST TV (4 ch)<br>4 TBB (6 ch)<br>5 SOUTH-NORTH TV (8 ch)<br>6 TV ARCTIC (10 ch)<br>7 TV ANTARCTIC (12 ch)<br><br>STANDARD ~60  CHANGE ~61 | CUSTOMIZED CATEGORY<br>CUSTOMIZED TIME<br>START-UP SCREEN<br><br>CHANGE ~62 |
| PASSWORD SETTING<br>CHANGE ~63 | |

OK  CANCEL

FIG.12

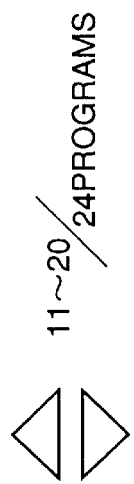

| | | | | |
|---|---|---|---|---|
| 22(MON.) | 13:00 (30) | TBB | CHICKS' ANGEL | S |
| 22(MON.) | 13:00 (90) | TV ANTARCTIC | MOVIE "BLACK TULIP" | |
| 22(MON.) | 13:30 (30) | TBB | I'M A GROWN UP! | S |
| 22(MON.) | 13:30 (30) | SOUTH-NORTH TV | EXPECTATION OF HAPPINESS | S |
| 22(MON.) | 14:05 (30) | NNK | Ms. REIKO'S DENTIST | C, R, B |
| 22(MON.) | 15:10 (50) | NNK | FRIENDS | C, R |
| 22(MON.) | 16:00 (60) | TBB | CUT EDO TOWN WITH OUR SWORD | R |
| 22(MON.) | 16:30 (60) | EAST-WEST TV | A HOMELESS CHILD | R,S |
| 22(MON.) | 16:30 (60) | SOUTH-NORTH TV | MAY LOVE BE WITH US! | R,S |
| 22(MON.) | 17:00 (60) | TBB | REASONS WHY I BORROWED MONEY FROM HER | R,S |

S : STEREO
C : CAPTION
R : RE-RUN
B : BILINGUAL

FIG.13

| PROGRAM SEARCH | | | |
|---|---|---|---|
| SEARCH SPAN | ○ TODAY  ○ UP TO YESTERDAY | ○ UP TO TOMORROW  ○ LAST WEEK | ○ THIS WEEK |
| TIME SLOT | ☐ : ☐  ~  ☐ : ☐ | | |
| CATEGORY | ☐ MOVIE  ☐ DRAMA  ☐ SPORTS  ☐ OTHER | | |
| | ☐ NNK  ☐ SOUTH-NORTH TV | ☐ NNK EDUCATION  ☐ TV ARCTIC | ☐ EAST-WEST TV  ☐ TV ANTARCTIC  ☐ TBB |
| SEARCH RESULT SUMMARY | ○ DISPLAY  ○ DO NOT DISPLAY | | |
| SEARCH   CANCEL | | | |

FIG.14

DETAILED PROGRAM GUIDE                                    RETURN

MONDAY DRAMA SPECIAL
NEW-YEAR SELECTION OF MISTERY DRAMA
I'LL KEEP YOUR MIND IN SAFETY

TBB  1/22 (MON.) 21:00 ~ 22:54

PLAY SCRIPT : BURYU ISHIHARA
CAST : YOUKO NOGIWA, SHOWKO NOMURA, JUN MIHO,
       KUMIKO FUJIYOSHI, YASUHIRO ARAI, SANJI OJIMA,
       KYOUZOU NAGATSUKA, AND OTHERS

Nana(NOGIWA) is a lady manager who runs a pawn shop in an old traditional district of Tokyo. A regular customer, Fukunishi(NAGATSUKA), seams to fancy her. He is a lawyer, and enjoy playing a manager of a neighborhood-kid baseball team. A team-member kid, Yusuke(OHBA), lives with his mother, katsue(FUJIYOSHI). One day Katsue receives an unexpected call from her missing husband, Tatsuya(ARAI), who says he will get killed unless she prepares ransom.

(PICTURE)

FIG.16

| CHANNEL-NUMBER SETTING | 1 | 2 | 3 | 4 | 5 | 6 | 7 | 8 | 9 | 10 | 11 | 12 |
|---|---|---|---|---|---|---|---|---|---|---|---|---|
| NNK | O | O | O | O | O | O | O | O | O | O | O | O |
| NNK EDUCATION | O | O | O | O | O | O | O | O | O | O | O | O |
| EAST-WEST TV | O | O | O | O | O | O | O | O | O | O | O | O |
| TBB | O | O | O | O | O | O | O | O | O | O | O | O |
| SOUTH-NORTH TV | O | O | O | O | O | O | O | O | O | O | O | O |
| TV ARCTIC | O | O | O | O | O | O | O | O | O | O | O | O |
| TV ANTARCTIC | O | O | O | O | O | O | O | O | O | O | O | O |

[NEXT SETTING] [RESET] [CANCEL] [RETURN]

FIG.17

CHANNEL-ORDER SETTING

TELEVISION STATION WITH NO CHANNEL-ORDER SETTING
WILL NOT APPEAR ON LISTING

| | | | | | | | | |
|---|---|---|---|---|---|---|---|---|
| NNK | 1ch | ○1 | ○2 | ○3 | ○4 | ○5 | ○6 | ○7 |
| NNK EDUCATION | 3ch | ○1 | ○2 | ○3 | ○4 | ○5 | ○6 | ○7 |
| EAST-WEST TV | 4ch | ○1 | ○2 | ○3 | ○4 | ○5 | ○6 | ○7 |
| TBB | 6ch | ○1 | ○2 | ○3 | ○4 | ○5 | ○6 | ○7 |
| SOUTH-NORTH TV | 8ch | ○1 | ○2 | ○3 | ○4 | ○5 | ○6 | ○7 |
| TV ARCTIC | 10ch | ○1 | ○2 | ○3 | ○4 | ○5 | ○6 | ○7 |
| TV ANTARCTIC | 12ch | ○1 | ○2 | ○3 | ○4 | ○5 | ○6 | ○7 |

RESET    CANCEL    RETURN

FIG.18

| OTHER SETTINGS | | | |
|---|---|---|---|
| CUSTOMIZED CATEGORY | ☐ MOVIE   ☐ DRAMA   ☐ DOCUMENTARY<br>☐ MUSIC   ☐ SPORTS   ☐ VARIETY<br>☐ NEWS   ☐ EDUCATIONAL   ☐ OTHERS | | |
| CUSTOMIZED TIME | ☐ : ☐ ~ ☐ : ☐ | | |
| START UP SCREEN | ○ MAIN MENU   ○ LISTING OF PROGRAMS   ○ CUSTOMIZED LISTING OF PROGRAMS<br>○ SPECIAL COVERAGE | | |
| [NEXT SETTING]   [RESET]   [CANCEL]   [RETURN] | | | |

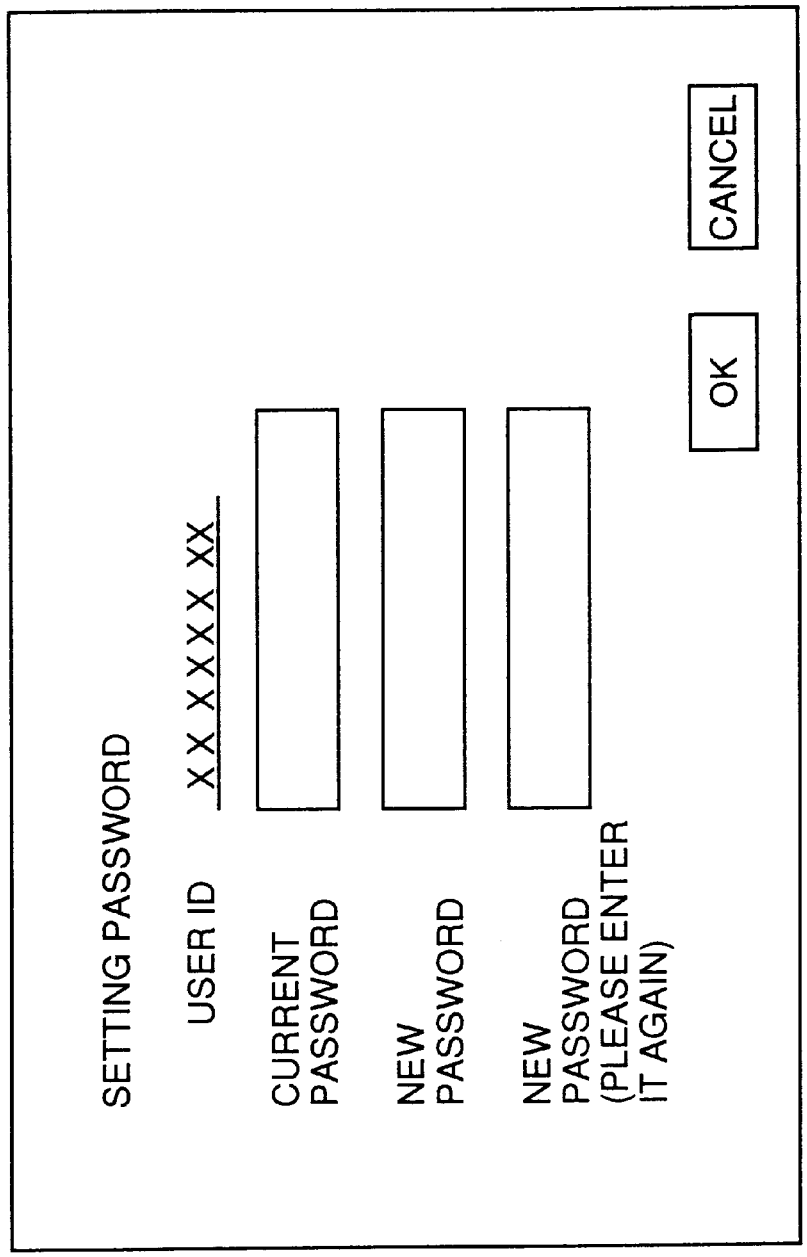

DEVICE FOR DELIVERING LISTINGS OF BROADCAST PROGRAMS VIA NETWORK

BACKGROUND OF THE INVENTION

1. Field of the Invention

The present invention generally relates to a broadcast-program-listing transmission device which transmits listings of broadcast programs to a plurality of terminal devices connected via a network or the like so as to show the listings of broadcast programs on display screens of the terminal devices, and particularly relates to a broadcast-program-listing transmission device which allows a listing of broadcast programs to be displayed according to user requests.

2. Description of the Prior Art

A listing of broadcast programs for television or the radio has been typically distributed to households by means of paper media such as newspapers. Progress in the use of networks such as the Internet, however, has made it possible to distribute a listing of broadcast programs via a network.

Conventionally, a listing of broadcast programs is transmitted via a network as follows. A service company affiliated with a broadcast station keeps listings of broadcast programs aired by this broadcast station in files by using the same format as a display format. Upon a request from a terminal device connected via a network, requested listings of broadcast programs are extracted from the files and sent to the terminal device via the network.

FIG. 1 is an illustrative drawing showing a conventional listing of broadcast programs stored in a file. As shown in FIG. 1, a listing of broadcast programs is kept in a file in the same format as a display format, so that a display can show an entire listing of broadcast programs for one week with respect to given time slots according to a schedule for the month. Listings of broadcast programs such as shown in FIG. 1 are sent via a network to a terminal device which requested the listings.

Upon receiving the listings of broadcast programs, the terminal device displays a listing on the display screen. By turning pages on the display screen, a user can search for a desired listing of broadcast programs on the display screen so as to obtain necessary information.

In this manner, a conventional configuration is that each broadcast station delivers listings of broadcast programs of its own station to terminal devices via a network. Because of this configuration, users cannot see and compare listings of broadcast programs between different stations simultaneously. That is, users cannot see a complete listing of all broadcast programs as they can see on a newspaper.

Further, since broadcast stations keep listings of broadcast programs in files by using a table format, even if there is a change in schedules due to unexpected big news, for example, it is not easy to modify the listings of broadcast programs stored in the files. This forces the broadcast station to transmit the listings of broadcast programs without making necessary modification, so that users cannot access correct information.

Moreover, a listing of broadcast programs for one week, which is shown on a display screen, has a fixed format. A user thus cannot display a listing of broadcast programs with respect to the user's desired date and time.

Also, the terminal device is not a device specifically designed for the purpose of accessing a listing of broadcast programs, but is merely a general-purpose terminal which is capable of being connected to a network. With such a configuration, the terminal device can only display a received listing of broadcast programs, and cannot provide the functions for searching for particular broadcast programs. That is, a user cannot search for broadcast programs which match the user's own interest.

Accordingly, there is a need for a broadcast-program-listing transmission device which can display a listing of broadcast programs in accordance with user requests on a display screen of a terminal device by transmitting the listing of broadcast programs to the terminal device connected via a network or the like.

SUMMARY OF THE INVENTION

Accordingly, it is a general object of the present invention to provide a broadcast-program-listing transmission device which can satisfy the need described above.

It is another and more specific object of the present invention to provide a broadcast-program-listing transmission device which can display a listing of broadcast programs in accordance with user requests on a display screen of a terminal device by transmitting the user requested listing of broadcast programs to the terminal device connected via a network or the like.

In order to achieve the above objects according to the present invention, a device is provided for sending listings of broadcast programs to a plurality of terminal devices connected via a network so that the plurality of terminal devices display the listings of broadcast programs on display screens. The device includes a program-management unit for keeping information about broadcast programs of a plurality of broadcast stations in a random-list format, a generation unit for extracting information from the program-management unit with respect to broadcast programs of a date and time indicated by one of the terminal devices, and for editing extracted information to generate a listing of broadcast programs, an addition unit for attaching at least one of a date change button, a time change button, and a search button to the listing of broadcast programs, the date change button and the time change button being used for changing a date and a time slot of a displayed listing of broadcast programs, respectively, the search button being used for displaying a listing of searched broadcast programs, and a sending unit for sending the listing of broadcast programs including the at least one of the date change button, the time change button, and the search button to the one of the terminal devices.

In the above device according to the present invention, the listing of broadcast programs with the attached buttons is sent to a terminal device, so that these buttons can be used on the side of the terminal device to change a date and time of the listing of broadcast programs or to search for a particular set of broadcast programs. The present invention thus allows a user of the terminal device to obtain a desired listing of broadcast programs by making a request to the device of the present invention.

According to an embodiment of the present invention, buttons having such functions can be implemented by using a URL, which indicates a place of a resource in a network. One of the characteristics of the present invention is that any further information in addition to the displayed listing of broadcast programs is obtained from the server device by a click of a button on the listing. Information obtained in such a manner is thus updated at all times.

Other objects and further features of the present invention will be apparent from the following detailed description when read in conjunction with the accompanying drawings.

BRIEF DESCRIPTION OF THE DRAWINGS

FIG. 1 is an illustrative drawing showing a conventional listing of broadcast programs stored in a file;

FIG. 10 is an illustrative drawing showing an example of an initial-setting screen;

FIG. 12 is an illustrative drawing showing an example of a listing of drama programs;

FIG. 13 is an illustrative drawing showing an example of a search-condition setting screen;

FIG. 14 is an illustrative drawing showing an example of a screen of a detailed program guide;

FIG. 16 is an illustrative drawing showing an example of a channel setting screen;

FIG. 17 is an illustrative drawing showing an example of a channel-order setting screen;

FIG. 18 is an illustrative drawing showing an example of a setting screen; and

FIG. 19 is an illustrative drawing showing an example of a password setting screen.

DESCRIPTION OF THE PREFERRED EMBODIMENTS

In the following, principles and embodiments of the present invention will be described with reference to the accompanying drawings.

Figure 2:
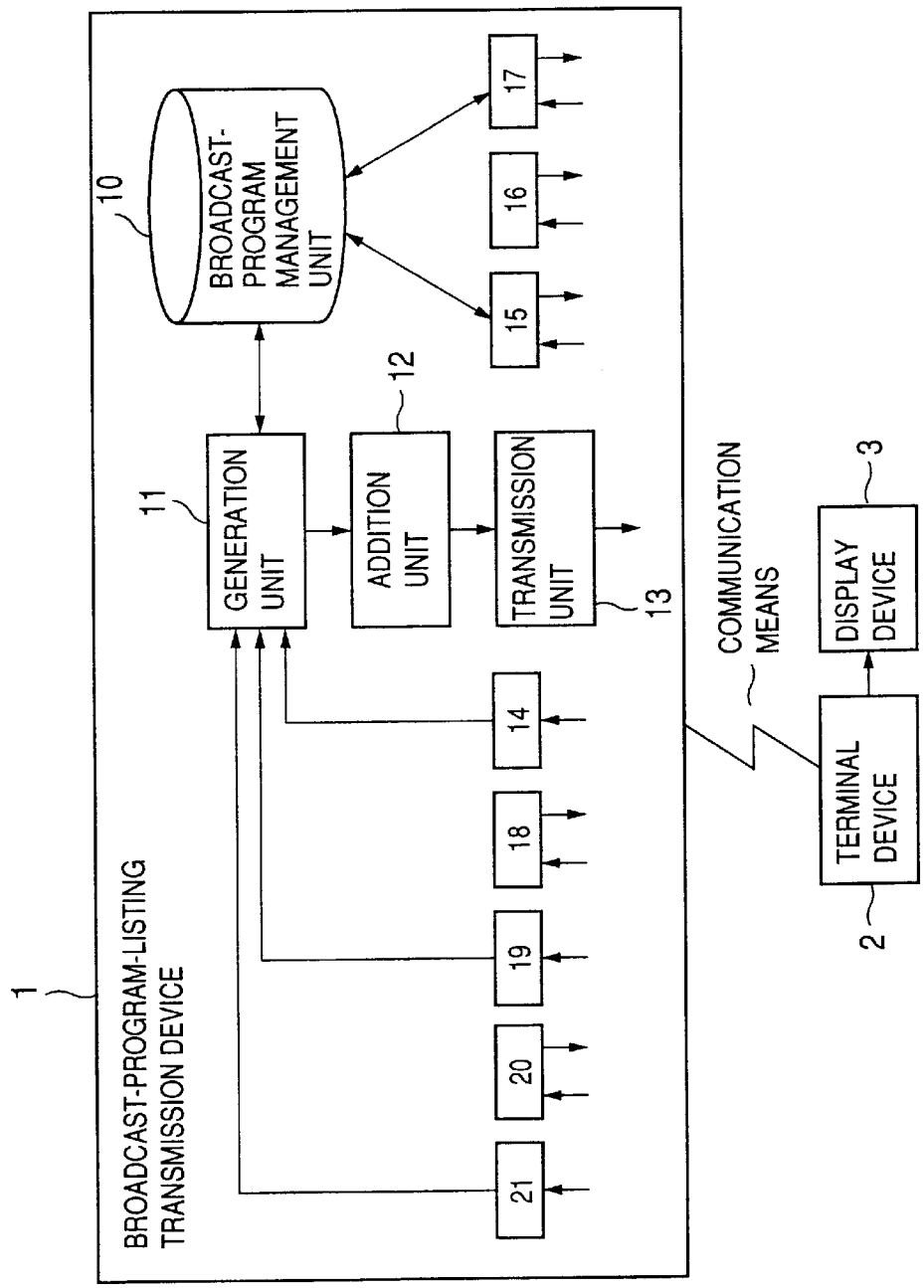
FIG. 2 is a block diagram of a broadcast-program-listing transmission device according to a principle of the present invention shown along with other elements constituting an entire system.

FIG. 2 is a block diagram of a broadcast-program-listing transmission device according to a principle of the present invention shown along with other elements constituting an entire system.

In FIG. 2, a broadcast-program-listing transmission device 1 is connected to a terminal device 2 via a communication means such as the Internet. The terminal device 2 is provided with a display device 3.

The broadcast-program-listing transmission device 1 of FIG. 2 displays a listing of broadcast programs on a display screen of the display device 3 by transmitting the listing of broadcast programs to the terminal device 2. The broadcast-program-listing transmission device 1 includes a broadcast-program management unit 10, a generation unit 11, an addition unit 12, a transmission unit 13, an activation unit 14, a category-search unit 15, a search-condition setting unit 16, a search unit 17, an initialization unit 18, an initial-activation unit 19, a display-content setting unit 20, and an instruction unit 21.

The broadcast-program management unit 10 keeps and manages information about broadcast programs of a plurality of broadcast stations in a random-list format. The generation unit 11 reads information about broadcast programs from the broadcast-program management unit 10 with respect to a date and time indicated by the terminal device 2, and edits the information to generate a listing of broadcast programs which is to be transmitted to the terminal device 2.

The addition unit 12 adds various buttons to the listing of broadcast programs generated by the generation unit 11. These buttons include a date-change button for changing a date of a displayed listing of broadcast programs, a time-slot-change button for changing time slots of a displayed listing of broadcast programs, a category-search button provided for each of different program categories in order to display a listing of broadcast programs classified in a particular category, and a search button for searching broadcast programs.

The transmission unit 13 transmits the listing of broadcast programs including the buttons added by the addition unit 12 to the terminal device 2 which requested the listing. The activation unit 14 activates the generation unit 11 by indicating an updated date or time when the terminal device 2 issues a program-update request via the date-change button or the time-slot-change button.

The category-search unit 15 reads broadcast-program information regarding a requested category from the broadcast-program management unit 10 when the terminal device 2 issues a request for a listing of broadcast programs of a particular category via a category-search button. Then, the category-search unit 15 edits the information into a listing format, and sends the listing of broadcast programs to the terminal device 2.

The search-condition setting unit 16 transmits screen data of a search screen, which is to be used to set search conditions for searching broadcast programs, to the terminal device 2 when the terminal device 2 issues a request for searching broadcast programs via the search button.

The search unit 17 reads broadcast-program information satisfying search conditions from the broadcast-program management unit 10 when the terminal device 2 sets the search conditions via the search screen transmitted from the search-condition setting unit 16. Then, the search unit 17 edits the information into a listing format, and sends the listing to the terminal device 2.

The initialization unit 18 sends screen data of a menu screen to the terminal device 2 when the terminal device 2 makes an activation request. The initial-activation unit 19 activates the generation unit 11 by indicating a current date and time when the terminal device 2 issues a request for displaying a listing of broadcast programs via the menu screen transmitted from the initialization unit 18.

The display-content setting unit 20 transmits screen data of a set screen to the terminal device 2 when the terminal device 2 issues a request via the menu screen to make settings of displayed contents of broadcast programs. Here, the set screen is used for setting the displayed contents. The instruction unit 21 instructs the generation unit 11 to generate a listing of broadcast programs in accordance with determined displayed contents when the terminal device 2 makes settings of displayed contents via the set screen transmitted from the display-content setting unit 20.

In the broadcast-program-listing transmission device 1 having the configuration as described above, the initialization unit 18 transmits the screen data of a menu screen to the terminal device 2 when the terminal device 2 requests activation. In response to this transmission, the terminal device 2 requests a listing of broadcast programs via the menu screen. In response, the initial-activation unit 19 activates the generation unit 11 by indicating a current date and time.

Having been activated, the generation unit 11 extracts broadcast-program information with respect to a current date and time from the information about broadcast programs of a plurality of broadcast stations stored in the broadcast-program management unit 10, and edits the extracted information into a listing format to create a listing of broadcast programs which is to be sent to the terminal device 2. The addition unit 12 adds the date-change button, the time-slot-change button, the category-search buttons, and the search button to the created listing of broadcast programs. The transmission unit 13 sends the listing of broadcast programs with the added buttons to the terminal device 2 which made the request.

Upon receiving the listing of broadcast programs, the terminal device 2 displays the listing of broadcast programs of the current date and time on the display device 3.

While the listing of broadcast programs is displayed on the display device 3, the terminal device 2 may issue a request via the date-change button or the time-slot-change button to change the listing of broadcast programs. In response, the activation unit 14 activates the generation unit 11 with an indication of a new date and time. The generation unit 11 reads broadcast-program information concerning the indicated date and time from the broadcast-program information of a plurality of broadcast stations stored in the broadcast-program management unit 10, and edits the information into a listing format to create a listing of broadcast programs which is sent to the terminal device 2.

In this manner, a user using the broadcast-program-listing transmission device 1 according to the present invention can obtain a listing of broadcast programs with respect to a desired date and time in the same format as can be seen on a newspaper. Further, the broadcast-program management unit 10 keeps and manages the broadcast-program information in a random-list format, which allows a service provider to easily change the broadcast-program information, so that the user can obtain the latest and most updated listing of broadcast programs at all times.

While the listing of broadcast programs is displayed on the display device 3, the terminal device 2 may issue a request via one of the category-search buttons to obtain a listing of broadcast programs classified in a particular category. In response, the category-search unit 15 reads broadcast-program information of the requested category from the broadcast-program management unit 10, and edits the information into a listing format to send the listing to the terminal device 2.

Further, the search-condition setting unit 16 transmits the screen data of a search screen, which is to be used to set search conditions for searching broadcast programs, to the terminal device 2 when the terminal device 2 issues a request via the search button for searching broadcast programs. By using the search screen, the terminal device 2 sets search conditions. In response, the search unit 17 reads broadcast-program information satisfying these search conditions from the broadcast-program management unit 10, and edits the information into a listing format to send the listing to the terminal device 2.

In this manner, a user using the broadcast-program-listing transmission device 1 according to the present invention can easily obtain a listing of broadcast programs of a desired category or a listing of broadcast programs which the user wishes to watch.

Further, the display-content setting unit 20 transmits the screen data of a set screen to the terminal device 2 when the terminal device 2 issues a request via the menu screen to make settings of displayed contents of broadcast programs. By using the set screen, the terminal device 2 makes settings of displayed contents. In response, the instruction unit 21 instructs the generation unit 11 to generate a listing of broadcast programs in accordance with the determined settings of displayed contents provided from the terminal device 2.

In this manner, a user using the broadcast-program-listing transmission device 1 according to the present invention can obtain a listing of broadcast programs whose contents are the same as those indicated by the user.

In the following, embodiments of the present invention will be described with reference to the accompanying drawings.

Figure 3:
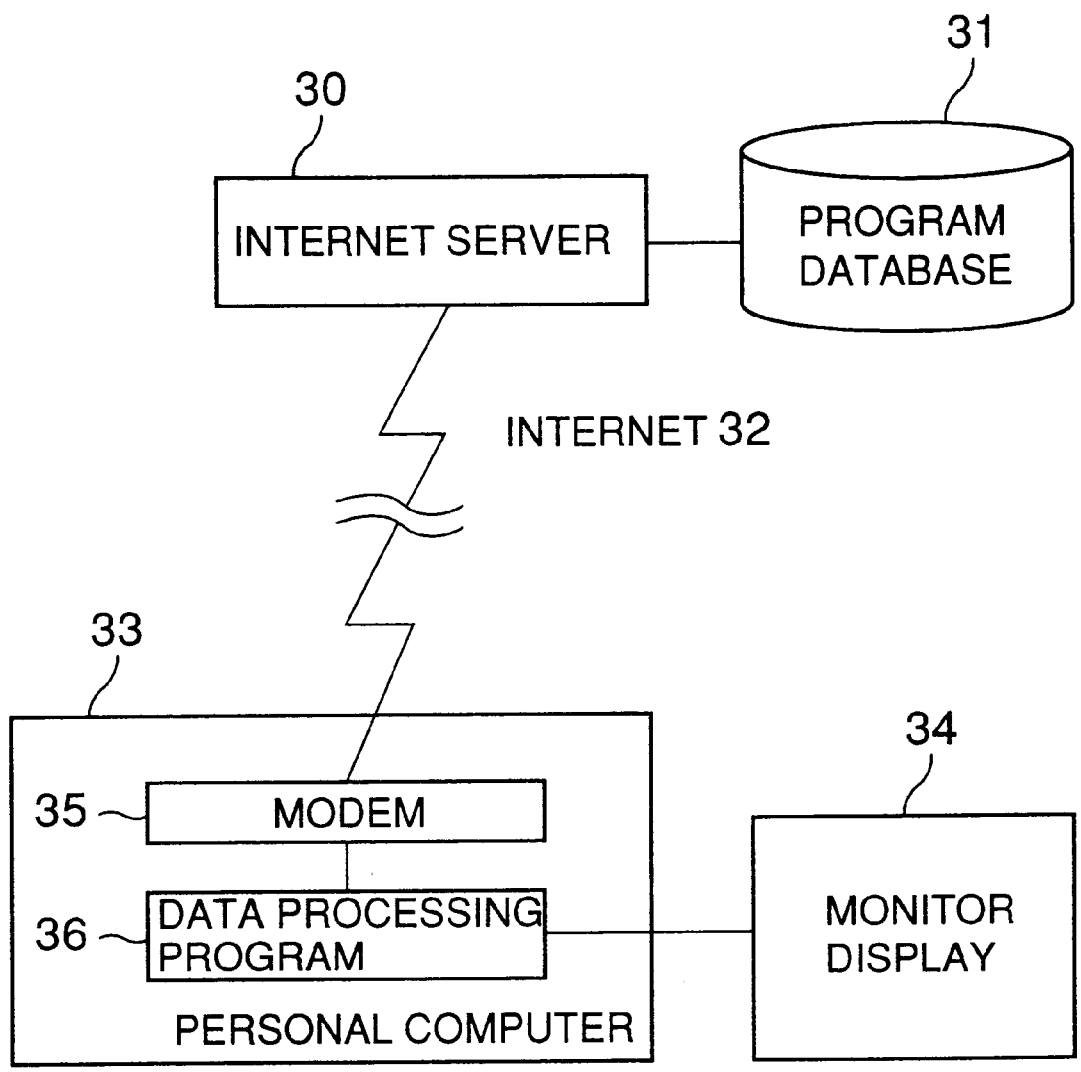
FIG. 3 is a block diagram of an embodiment of a network system according to the present invention.

FIG. 3 is a block diagram of an embodiment of a network system according to the present invention. In FIG. 3, the network system includes an internet server 30, a program database 31, an Internet 32, a personal computer 33, and a monitor display 34. Here, the Internet 32 is merely used as an example, and any other type of networks may be used in the present invention.

Figures 4, 5:
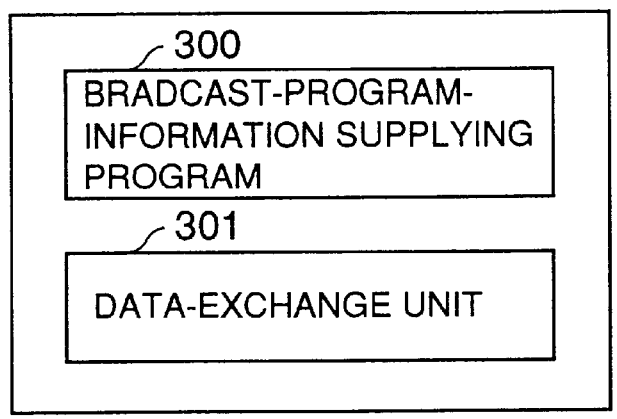
FIG. 4 is a block diagram of the internet server of FIG. 3.
FIG. 5 is an illustrative drawing showing an example of television-program information stored in the program database of FIG. 3.

FIG. 4 is a block diagram of the internet server 30 of FIG. 3. The internet server 30 of FIG. 4 includes a broadcast-program-information supplying program 300 and a data-exchange unit 301.

The internet server 30 according to the present invention is connected to the Internet 32. The internet server 30 is provided with the broadcast-program-information supplying program 300 for supplying information on television programs, and is provided with the data-exchange unit 301 for conducting data exchange with the personal computer 33.

As shown in FIG. 3, the personal computer 33 includes a modem 35 and a data processing program 36. The personal computer 33 uses the modem 35 to receive a listing of television programs from the internet server 30, and uses the data processing program 36 to display the listing of television programs on the monitor display 34.

The broadcast-program-information supplying program 300 of the internet server 30 supplies information about television programs by using television-program information stored in the program database 31. To this end, the program database 31 stores television-program information (an air date, a name of a television station, an air time, a category of a television program, a title of the television program, a program guide, etc.) with respect to each television station in a random-list format. FIG. 5 is an illustrative drawing showing an example of the television-program information stored in the program database 31.

Since the program database 31 keeps the television-program information in a random-list format rather than in a table format, the contents of the information can be easily modified. An administrator of the program database 31 is thus able to make an amendment promptly and readily to the information in the program database 31 when there is a change of schedules or contents to the television programs.

Figure 6:
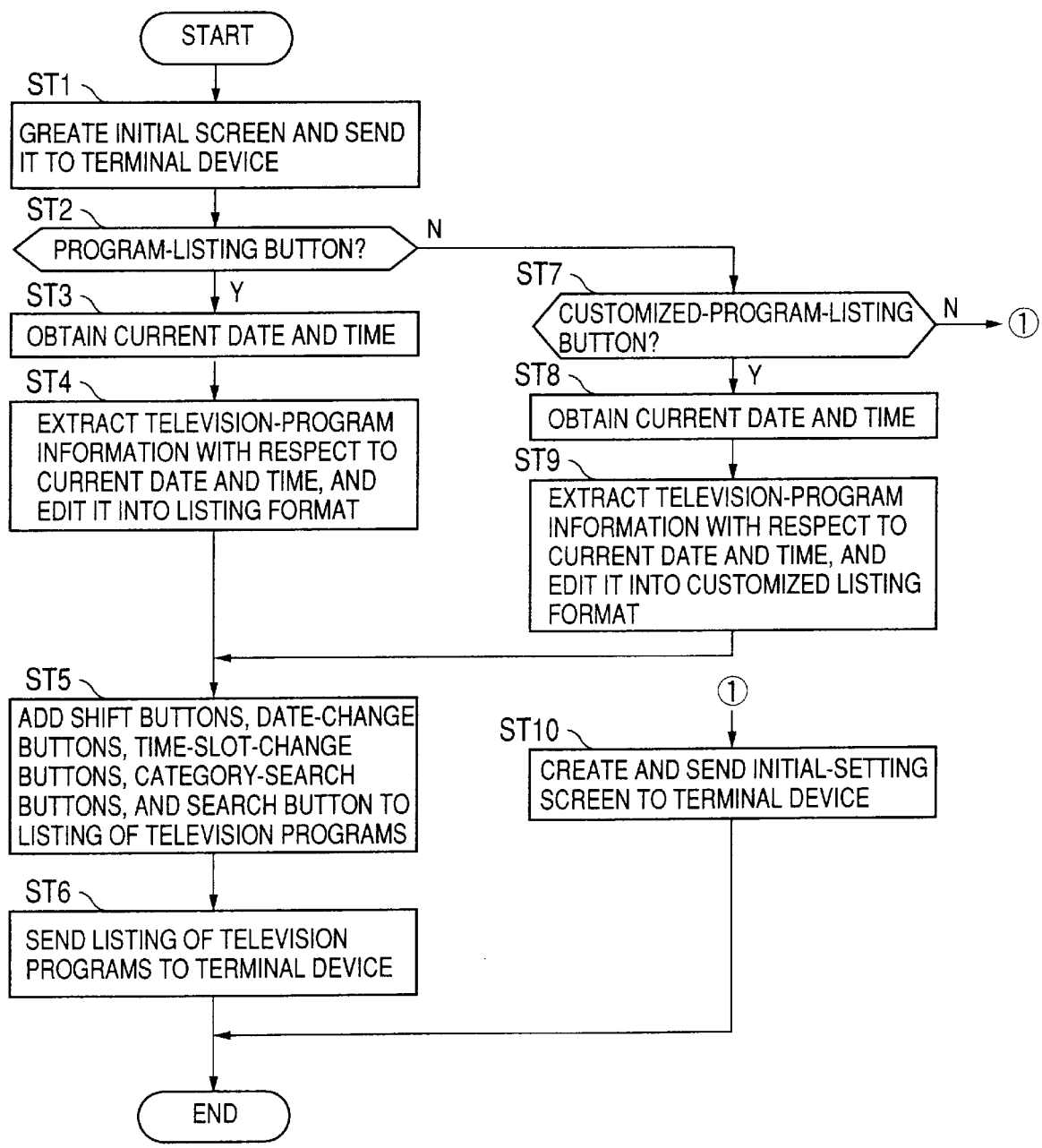
FIG. 6 is a flowchart of a process of the broadcast-program-information supplying program of FIG. 4.
Figure 7:
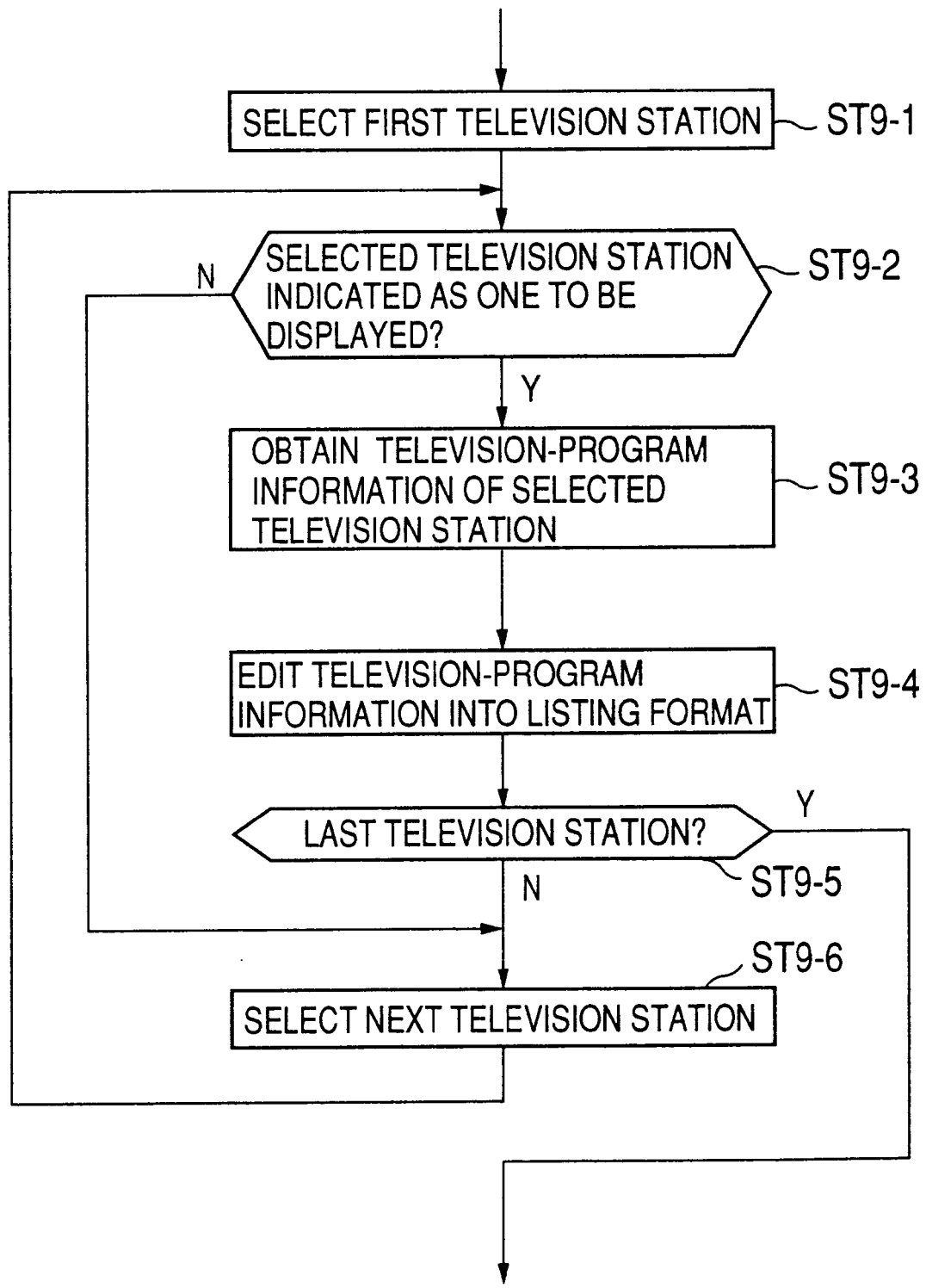
FIG. 7 is a flowchart of a process which is carried out at a step ST9 of FIG. 6.

FIG. 6 is a flowchart of a process of the broadcast-program-information supplying program 300. FIG. 7 is a flowchart of a process which is carried out at a step ST9 of FIG. 6. In the following, the present invention will be described in detail with reference to these flowcharts.

At a step ST1, upon an activation request from a user operating the personal computer 33, the broadcast-program-information supplying program 300 creates an initial screen and sends it to the personal computer (terminal device) 33, so that the initial screen is displayed on the monitor display 34 of the personal computer 33.

Figure 8:
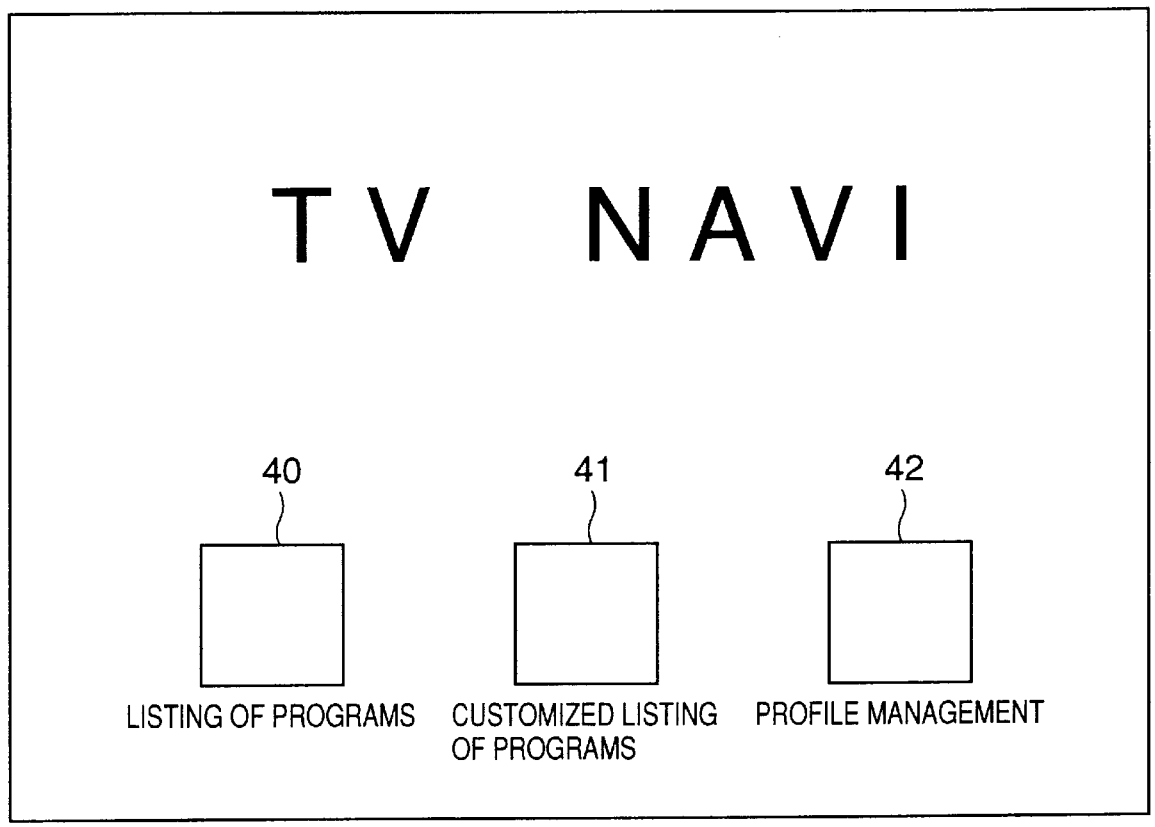
FIG. 8 is an illustrative drawing showing an example of an initial screen.

FIG. 8 is an illustrative drawing showing an example of the initial screen. As shown in figure, the initial screen includes a program-listing button 40, a customized-program-listing button 41, and a profile-management button 42. These buttons have an assigned URL (a symbol indicating a place of a resource in the Internet 32) in connection with the broadcast-program-information supplying program 300. When the user operates these buttons, operations on these buttons are sent to the broadcast-program-information supplying program 300 so that the broadcast-program-information supplying program 300 is informed of these operations.

At a step ST2, the broadcast-program-information supplying program 300 checks whether an operation is made by the user on the program-listing button 40. If it is, the procedure goes to a step ST3. Otherwise, the procedure goes to a step ST7.

At the step ST3, the broadcast-program-information supplying program 300 obtains a current date and time.

At a step ST4, the broadcast-program-information supplying program 300 extracts television-program information from the program database 31 with respect to the current date and time, and edits the extracted information into a listing format.

At a step ST5, the broadcast-program-information supplying program 300 adds shift buttons, date-change buttons, time-slot-change buttons, category-search buttons, and a search button to the listing of television programs so as to create a screen of the listing of television programs.

At a step ST6, the broadcast-program-information supplying program 300 sends the screen of a listing of television programs to the personal computer 33, so that the monitor display 34 of the personal computer 33 displays the listing of television programs.

Figure 9:
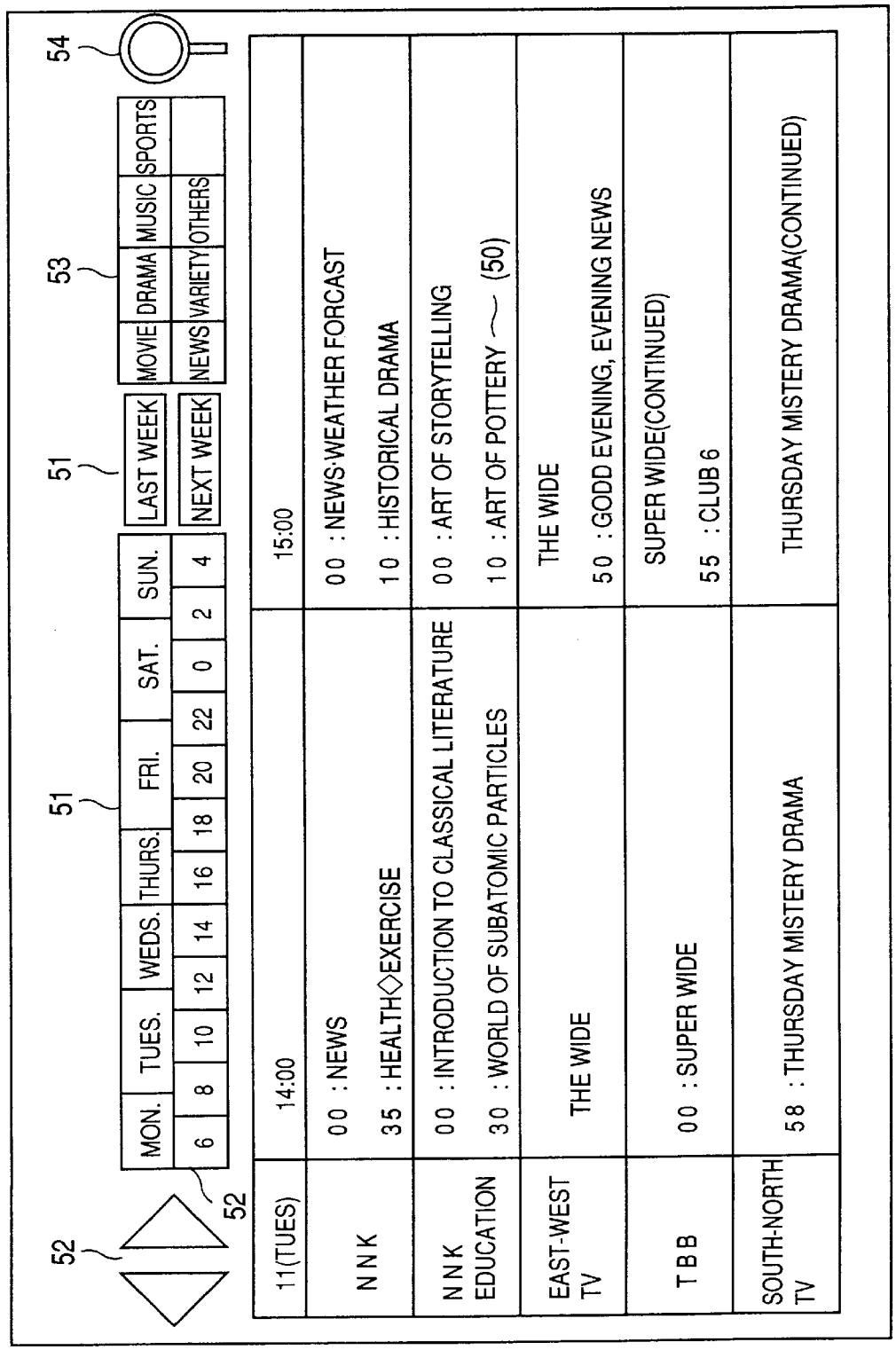
FIG. 9 is an illustrative drawing showing an exemplary screen of a listing of television programs which is created after the broadcast-program-information supplying program edits extracted information into a listing format and adds buttons.

FIG. 9 is an illustrative drawing showing an exemplary screen of a listing of television programs which is created after the broadcast-program-information supplying program 300 edits the information into a listing format and adds the buttons. As shown in the figure, the screen of a listing of television programs shows television programs in a table format which are aired by each television station on the indicated date during a time slot of the indicated time.

As shown in FIG. 9, the screen of a listing of television programs includes shift buttons 50, date-change buttons 51, time-slot-change buttons 52, category-search buttons 53, and a search button 54. The shift buttons 50 are provided for respective television programs (only one shift button is shown in the figure for the sake of clarity), and are used for giving an instruction to display a screen which shows details of the selected television program. The date-change buttons 51 are used for issuing an instruction to change the date of displayed information, and include change buttons for changing the date by one week and other change buttons for changing the day. The time-slot-change buttons 52 are used for giving an instruction to change the displayed time slot, and includes change buttons for changing the time slot by a unit of two hours. The category-search buttons 53 are provided for respective television-program categories, and are used for issuing an instruction to search for television programs classified in a selected category. The search button 54 is used for giving an instruction to search for television programs. These buttons have an assigned URL in connection with the broadcast-program-information supplying program 300.

With reference to FIG. 6 again, at the step ST7, when it turns out at the step ST2 that the button operated by the user is not the program-listing button 40, the broadcast-program-information supplying program 300 checks whether the button operated by the user is the customized-program-listing button 41. If it is, the procedure goes to a step ST8. Otherwise, the procedure goes to a step ST10.

At the step ST8, the broadcast-program-information supplying program 300 obtains a current date and time.

At the step ST9, the broadcast-program-information supplying program 300 extracts television-program information from the program database 31 with respect to the current date and time, and edits the extracted information into a customized listing format in accordance with the customized-program-listing instruction.

The customized-program-listing instruction is used for displaying a listing of television programs with contents which are customized by the user. As will be described later, a selection of contents are made by the user interactively operating a setting screen, which is displayed upon a selection of the profile-management button 42. According to this embodiment, when the customized-program-listing instruction is given, a decision can be made as to whether to display a given television station with respect to each television station. At the step ST9, thus, the television-program information is extracted by deciding whether to display a given television station at every turn. Details of steps carried out at the step ST9 will be described below with reference to FIG. 7.

At a step ST9-1, a television station which is first on a list of television stations is selected.

At a step ST9-2, a check is made whether the selected television station is indicated as one to be displayed. If it is, the procedure goes to a step ST9-3. Otherwise, the procedure goes to a step ST9-6.

At the step ST9-3, television-program information of the selected television station is extracted from the program database 31 with respect to the current date and time.

At a step ST9-4, the extracted television-program information is edited into a listing format in accordance with the customized-program-listing instruction.

At a step ST9-5, a check is made whether the selected television station is the last on the list of television stations. If it is, the procedure ends. Otherwise, the procedure goes to the step ST9-6.

At the step ST9-6, a next television station on the list of television station is selected. Then, the procedure goes back to the step ST9-2 to repeat the above steps.

In the manner described above, the step ST9 of FIG. 6 is carried out.

With reference to FIG. 6 again, at the step ST5 following the step ST9, the broadcast-program-information supplying program 300 adds the shift buttons 50, the date-change buttons 51, the time-slot-change buttons 52, the category-search buttons 53, and the search button 54 so as to create a screen of a customized listing of television programs.

At the step ST6, the broadcast-program-information supplying program 300 sends the screen of a customized listing of television programs to the personal computer 33, so that the monitor display 34 of the personal computer 33 displays the customized listing of television programs.

At the step 10, when it turns out at the step ST7 that the button operated by the user is not the customized-program-listing button 41, i.e., when it is found that the operated button is the profile-management button 42, the broadcast-program-information supplying program 300 creates and sends an initial-setting screen to the personal computer 33, so that the monitor display 34 of the personal computer 33 displays the initial-setting screen.

FIG. 10 is an illustrative drawing showing an example of the initial-setting screen. As shown in the figure, the initial-setting screen includes a standard button 60 and modify buttons 61 through 63. The standard button 60 is used for issuing an instruction to assign channel numbers to television stations and decide an order of displayed television stations according to a standard format. The modify button 61 is used for giving an instruction to assign non-standard channel numbers to the television stations and change an order of the displayed television stations. The modify button 62 is used for making a request to change customized categories, customized time, and a start-up screen. The modify button 63 is used for issuing a request to change a password. URL is assigned to each of these buttons in connection with the broadcast-program-information supplying program 300.

In this manner, the broadcast-program-information supplying program 300, upon an activation request from the user, carries out the process shown in the flowchart of FIG. 6 so as to create a screen of a listing of television programs which are aired by each television station on the current date and time. The created screen of the listing of television programs is displayed on the monitor display 34 of the personal computer 33. Alternately, a screen of a customized listing of television programs may be created and displayed on the monitor display 34 of the personal computer 33.

Figure 11A:
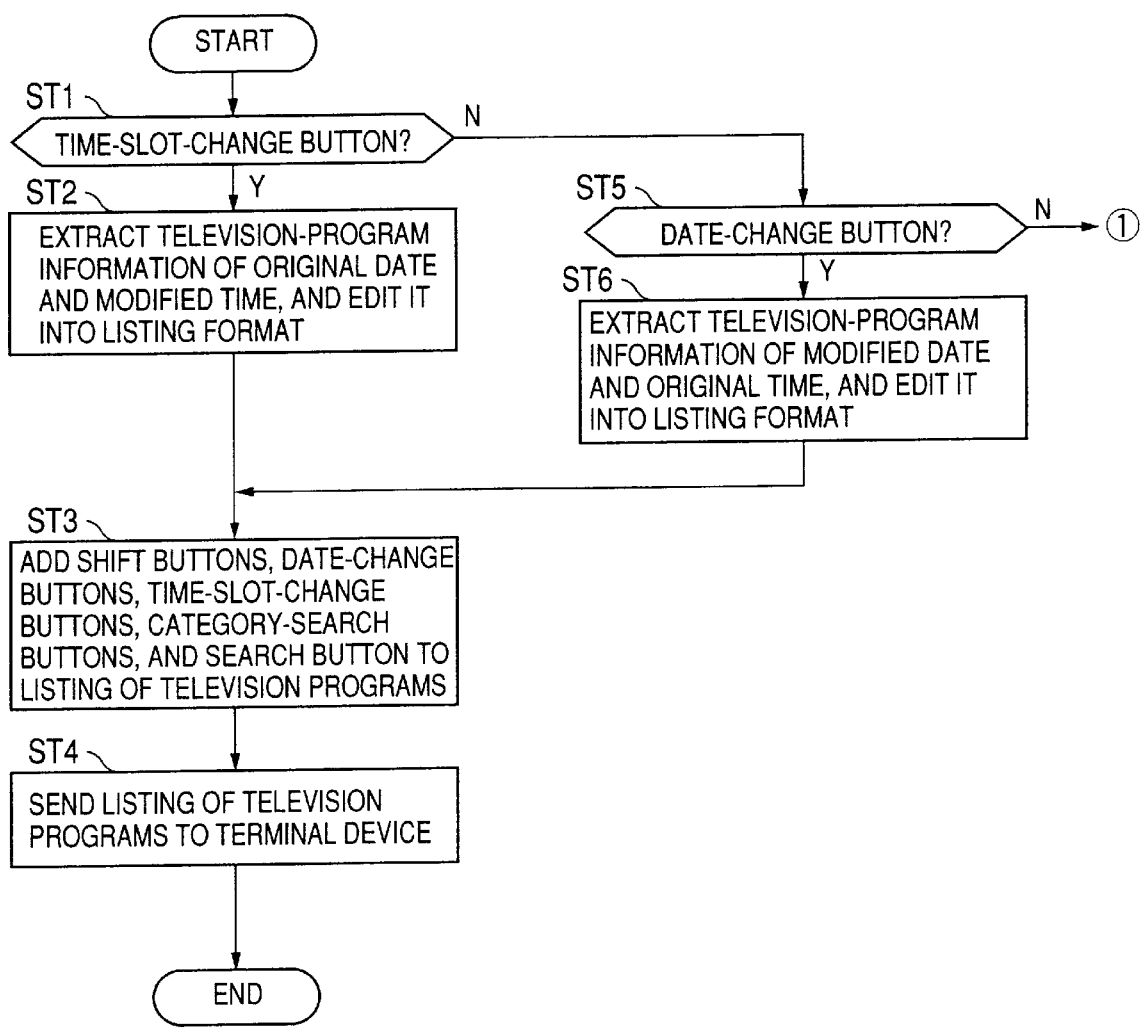
FIGS. 11A and 11B are a flowchart of a process which is carried out by the broadcast-program-information supplying program when a listing of television programs is displayed on the monitor display of FIG. 3.
Figure 11B:
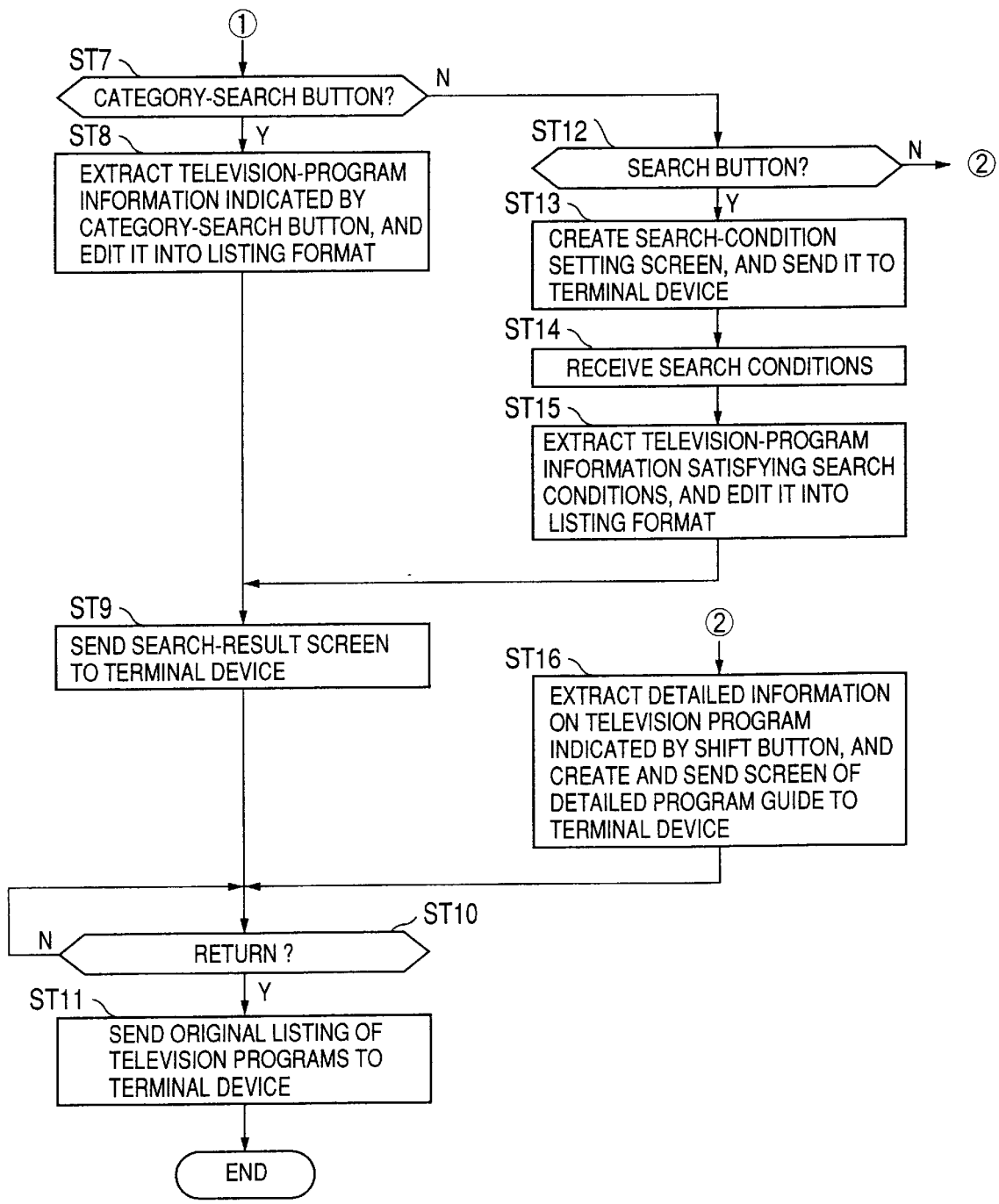

FIGS. 11A and 11B are a flowchart of a process which is carried out by the broadcast-program-information supplying program 300 when a listing of television programs (such as shown in FIG. 9) is displayed on the monitor display 34. This process will be described below with reference to FIGS. 11A and 11B.

At a step ST1, upon a user operation on a button when a listing of the television programs is displayed on the monitor display 34 of the personal computer 33, the broadcast-program-information supplying program 300 checks whether the operated button is one of the time-slot-change buttons 52. If it is, the procedure goes to a step ST2. Otherwise, the procedure goes to a step ST5.

At the step ST2, the broadcast-program-information supplying program 300 extracts the television-program information of an original date and modified time from the program database 31, and edits the information into a listing format.

At a step ST3, the broadcast-program-information supplying program 300 adds the shift buttons 50, the date-change buttons 51, the time-slot-change buttons 52, the category-search buttons 53, and the search button 54 to the listing of television programs of each television station so as to create a screen of a listing of television programs.

At a step ST4, the broadcast-program-information supplying program 300 sends the screen of a listing of television programs to the personal computer 33, so that the monitor display 34 of the personal computer 33 displays the listing of television programs in accordance with the request.

In this manner, operating the time-slot-change buttons 52, the user can obtain a listing of television programs with respect to a time period in which the user wishes to watch television.

At the step ST5, when it is found at the step ST1 that the button operated by the user is not the time-slot-change buttons 52, the broadcast-program-information supplying program 300 checks whether the operated button is one of the date-change buttons 51. If it is, the procedure goes to a step ST6. Otherwise, the procedure goes to a step ST7 (FIG. 11B).

At the step ST6, the broadcast-program-information supplying program 300 extracts the television-program information of a modified date and original time from the program database 31, and edits the information into a listing format.

At the step ST3 following the step ST6, the broadcast-program-information supplying program 300 adds the shift buttons 50, the date-change buttons 51, the time-slot-change buttons 52, the category-search buttons 53, and the search button 54 to the listing of television programs of each television station so as to create a screen of a listing of television programs.

At the step ST4, the broadcast-program-information supplying program 300 sends the screen of a listing of television programs to the personal computer 33, so that the monitor display 34 of the personal computer 33 displays the listing of television programs in accordance with the request.

In this manner, operating the date-change buttons 51, the user can obtain a listing of television programs with respect to a desired date.

At the step ST7 (FIG. 11B), when it is found at the step ST5 that the button operated by the user is not the date-change buttons 51, the broadcast-program-information supplying program 300 checks whether the operated button is one of the category-search buttons 53. If it is, the procedure goes to a step ST8. Otherwise, the procedure goes to a step ST12.

At the step ST8, the broadcast-program-information supplying program 300 extracts the television-program information from the program database 31 such that television programs of the extracted information fall into a category indicated by the selected one of the category-search buttons 53, and edits the extracted information into a predetermined listing format to create a search-result screen.

At a step ST9, the broadcast-program-information supplying program 300 sends the search-result screen to the personal computer 33, so that the monitor display 34 of the personal computer 33 displays the search-result screen which lists the television programs falling into the requested program category.

At a step ST10, the broadcast-program-information supplying program 300 checks whether a return button on the search-result screen is clicked. If it is, the procedure goes to a step ST11. Otherwise, the procedure comes back to the step ST10 so as to wait until the return button is operated.

At the step ST11, the broadcast-program-information supplying program 300 sends the original screen of a listing of television programs to the personal computer 33, so that the monitor display 34 of the personal computer 33 displays the original listing of television programs.

In this manner, if the user wishes to look through information about drama programs, for example, the user can obtain a listing of drama programs by operating one of the category-search buttons 53 which is provided for searching drama programs. FIG. 12 is an illustrative drawing showing an example of a listing of drama programs.

At the step ST12, when it is found at the step ST7 that the button operated by the user is not the category-search buttons 53, the broadcast-program-information supplying program 300 checks whether the operated button is the search button 54. If it is, the procedure goes to a step ST13. Otherwise, the procedure goes to a step ST16.

At the step ST13, the broadcast-program-information supplying program 300 creates a search-condition setting screen, and sends it to the personal computer 33, so that the monitor display 34 of the personal computer 33 displays the search-condition setting screen.

FIG. 13 is an illustrative drawing showing an example of the search-condition setting screen. As shown in the figure, the search-condition setting screen includes a field for setting a time span for a search, a field for setting a time slot for a search, a field for setting a program category to be searched for, and a field for setting one or more television stations to be included in a search.

At a step ST14 following the step ST13, the broadcast-program-information supplying program 300 receives data of search conditions entered through the search-condition setting screen.

At a step ST15, the broadcast-program-information supplying program 300 extracts the television-program information from the program database 31 such that television programs of the extracted information satisfies the received search conditions, and edits the extracted information into a predetermined listing format to create a search-result screen.

At the step ST9 following the step ST15, the broadcast-program-information supplying program 300 sends the search-result screen to the personal computer 33, so that the monitor display 34 of the personal computer 33 displays the search-result screen which lists the television programs which the user wishes to watch.

At the step ST10, the broadcast-program-information supplying program 300 checks whether a return button on the search-result screen is clicked. If it is, the procedure goes to the step ST11. Otherwise, the procedure comes back to the step ST10 so as to wait until the return button is operated.

At the step ST11, the broadcast-program-information supplying program 300 sends the original screen of a listing of television programs to the personal computer 33, so that the monitor display 34 of the personal computer 33 displays the original listing of television programs.

In this manner, the user can obtain a listing of television programs which the user wishes to watch by operating the search button 54 and entering search conditions through the search-condition setting screen to obtain the listing of television programs which satisfy the entered search conditions. FIG. 12 shows an example of such a listing of television programs.

At the step ST16, when it is found at the step ST12 that the button operated by the user is not the search button 54 and, thus, should be one of the shift buttons 50, the broadcast-program-information supplying program 300 extracts detailed information on a television program indicated by the selected one of the shift buttons 50 from the program database 31 to create a screen of a detailed program guide, and sends this screen of a detailed program guide to the personal computer 33. In response, the personal computer 33 displays the screen of a detailed program guide on the monitor display 34. FIG. 14 is an illustrative drawing showing an example of the screen of a detailed program guide.

At the step ST10 following the step ST16, the broadcast-program-information supplying program 300 checks whether a return button on the screen of a detailed program guide is clicked. If it is, the procedure goes to the step ST11. Otherwise, the procedure comes back to the step ST10 so as to wait until the return button is operated.

At the step ST11, the broadcast-program-information supplying program 300 sends the original screen of a listing of television programs to the personal computer 33, so that the monitor display 34 of the personal computer 33 displays the original listing of television programs.

In this manner, when a user operates a button when a listing of television programs as shown in FIG. 9 is displayed on the monitor display 34 of the personal computer 33, the broadcast-program-information supplying program 300 carries out the process of the flowchart of FIGS. 11A and 11B so as to display a listing of television programs of a desired date, a listing of television programs of a desired time slot, a listing of television programs of a desired category obtained by a search, a listing of desired television programs obtained by a search, or a detailed program guide to a desired television program.

Figure 15A:
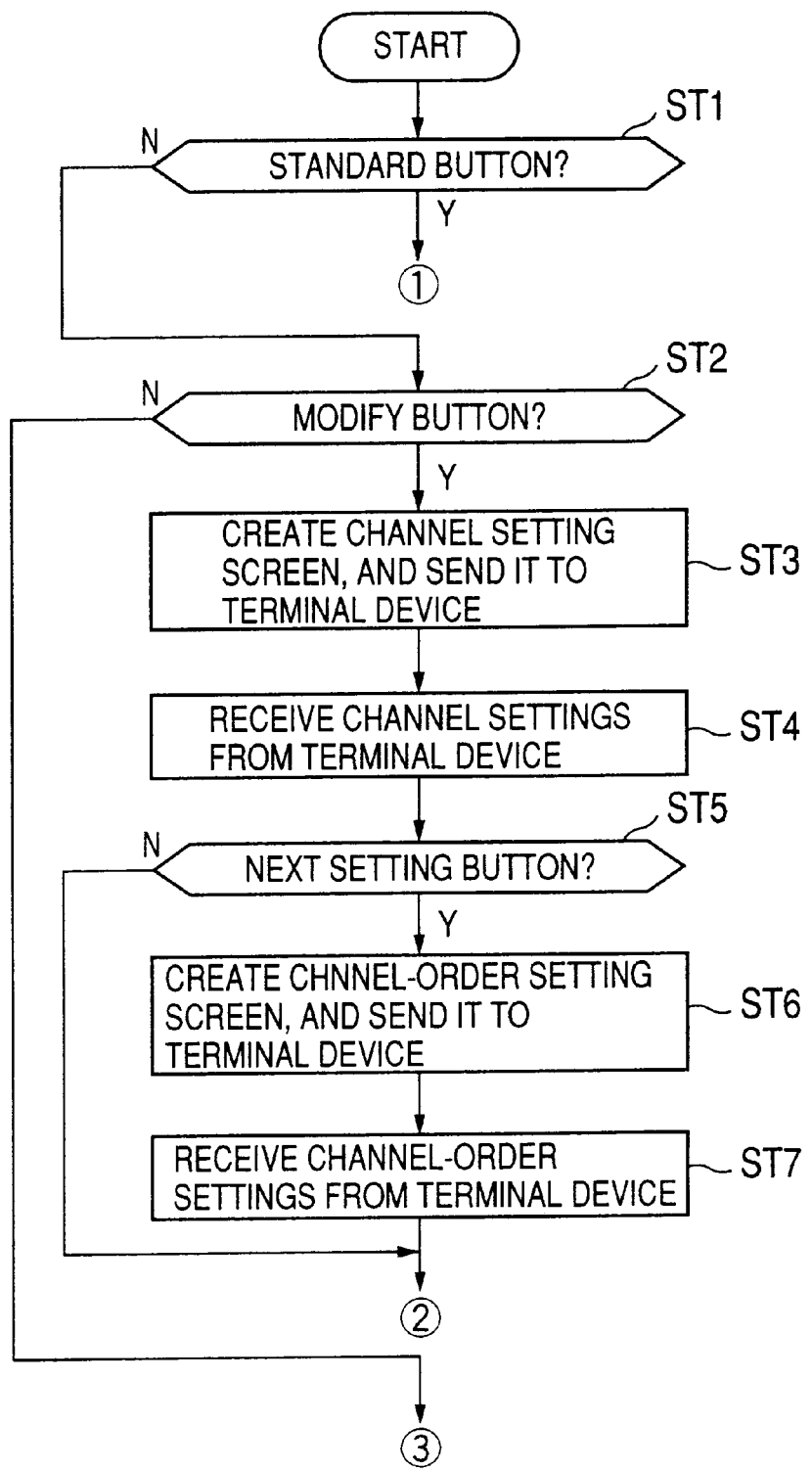
FIGS. 15A and 15B are a flowchart of a process carried out by the broadcast-program-information supplying program when the initial-setting screen of FIG. 10 is displayed on the monitor display of FIG. 3.
Figure 15B:
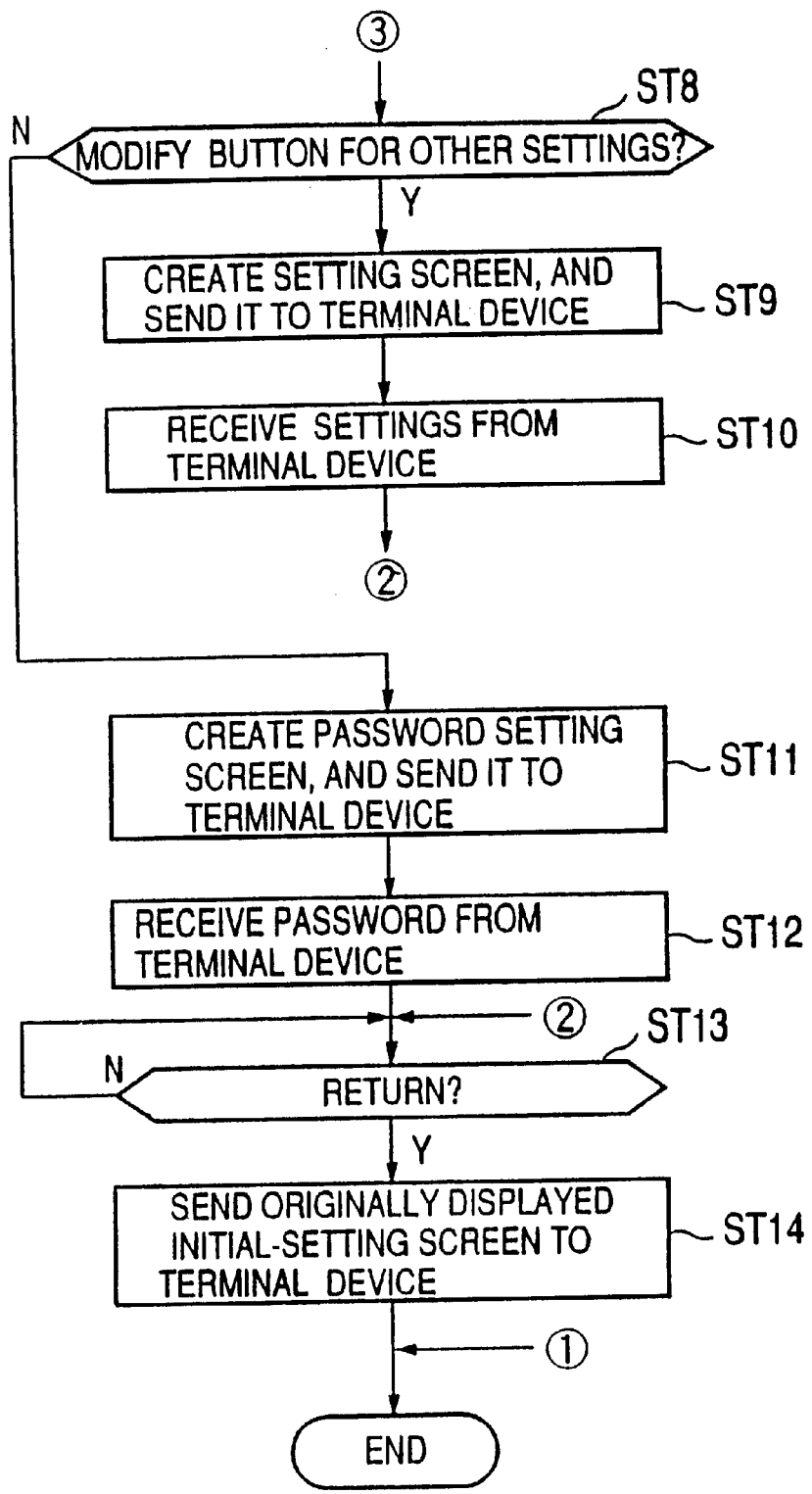

FIGS. 15A and 15B are a flowchart of a process carried out by the broadcast-program-information supplying program 300 when the initial-setting screen of FIG. 10 is displayed on the monitor display 34. This process will be described below with reference to FIGS. 15A and 15B.

At a step ST1, when a user operates a button when an initial-setting screen is displayed on the monitor display 34 of the personal computer 33, the broadcast-program-information supplying program 300 checks whether the operated button is the standard button 60 (which is used for giving an instruction to assign channel numbers to television stations and decide an order of displayed television stations according to a standard format). If it is, the procedure ends because the use of the available standard format requires no further instruction from the user. If the operated button is not the standard button 60, the procedure goes to a step ST2.

At the step ST2, broadcast-program-information supplying program 300 checks whether the operated button is the modify button 61 (which is used for assigning non-standard channel numbers to television stations and displaying the television stations in a customized order). If it is, the procedure goes to a step ST3. Otherwise, the procedure goes to a step ST8.

At the step ST3, the broadcast-program-information supplying program 300 creates a channel setting screen used for assigning channel numbers to television stations, and sends it to the personal computer 33 so that the personal computer 33 displays the channel setting screen on the monitor display 34. FIG. 16 is an illustrative drawing showing an example of the channel setting screen.

At a step ST4, the broadcast-program-information supplying program 300 receives channel settings from the personal computer 33 when the user selects a channel number with respect to each television station on the channel setting screen.

At a step ST5, the broadcast-program-information supplying program 300 checks whether a next setting button on the channel setting screen is operated, thereby checking whether an instruction is given to modify an order of displayed television stations. If it is, the procedure goes to a step ST6. Otherwise, the procedure goes to a step ST13.

At the step ST6, the broadcast-program-information supplying program 300 creates a channel-order setting screen used for setting an order of displayed television stations, and sends it to the personal computer 33 so that the personal computer 33 displays the channel-order setting screen on the monitor display 34. FIG. 17 is an illustrative drawing showing an example of the channel-order setting screen.

At a step ST7, the broadcast-program-information supplying program 300 receives channel-order settings from the personal computer 33 when the user enters channel orders into the channel-order setting screen. Here, according to the configuration of this embodiment, a given television station is not displayed when no channel order is provided for this television station.

At the step ST13, following the step ST7 or when it is found at the step ST5 that no instruction to modify the order of displayed television stations is given, the broadcast-program-information supplying program 300 checks whether a return button on the channel setting screen or the channel-order setting screen is operated. If it is, the procedure goes to a step ST14. Otherwise, the procedure comes back to the step ST13 so as to wait until the return button is selected.

At the step ST14, the broadcast-program-information supplying program 300 sends the initial-setting screen originally displayed to the personal computer 33, so that the monitor display 34 of the personal computer 33 displays the initial-setting screen as it was displayed before.

At the step ST8, when it turns out at the step ST2 that the operated button is not the modify button 61, the broadcast-program-information supplying program 300 checks whether the operated button is the modify button 62 (which is used for modifying customized categories, customized time slots, or a start-up screen). If it is, the procedure goes to a step ST9. Otherwise, the procedure goes to a step ST11.

At the step ST9, the broadcast-program-information supplying program 300 creates a setting screen which is used for setting customized categories (only the television programs falling into these categories will be displayed on a listing of television programs), customized time slots (only the television programs in these time slots will be displayed on a listing of television programs), and a start-up screen (this start-up screen will be displayed at the time of starting up). The broadcast-program-information supplying program 300 sends the setting screen to the personal computer 33 so that the personal computer 33 displays the setting screen on the monitor display 34. FIG. 18 is an illustrative drawing showing an example of the setting screen.

At a step ST10, the broadcast-program-information supplying program 300 receives settings from the personal computer 33 when the user enters these settings through the setting screen.

At the step ST13 following the step ST10, the broadcast-program-information supplying program 300 checks whether a return button on the setting screen is operated. If it is, the procedure goes to the step ST14. Otherwise, the procedure comes back to the step ST13 so as to wait until the return button is selected.

At the step ST14, the broadcast-program-information supplying program 300 sends the initial-setting screen originally displayed to the personal computer 33, so that the monitor display 34 of the personal computer 33 displays the initial-setting screen as it was displayed before.

At a step ST11, when it is found at the step ST8 that the operated button is not the modify button 62, and, thus, should be the modify button 63 (used for modifying a password), the broadcast-program-information supplying program 300 creates a password setting screen used for setting a password, and sends it to the personal computer 33 so that the personal computer 33 displays the password setting screen on the monitor display 34. FIG. 19 is an illustrative drawing showing an example of the password setting screen.

At the step ST12, the broadcast-program-information supplying program 300 receives a password when the user enters the password into the password setting screen.

At the step ST13 following the step ST12, the broadcast-program-information supplying program 300 checks whether a return button (an OK button or a CANCEL button) on the password setting screen is operated. If it is, the procedure goes to the step ST14. Otherwise, the procedure comes back to the step ST13 so as to wait until the return button is selected.

At the step ST14, the broadcast-program-information supplying program 300 sends the initial-setting screen originally displayed to the personal computer 33, so that the monitor display 34 of the personal computer 33 displays the initial-setting screen as it was displayed before.

In this manner, upon a user operation on a button when the initial-setting screen as shown in FIG. 10 is displayed on the monitor display 34 of the personal computer 33, the broadcast-program-information supplying program 300 carries out the process of the flowchart of FIGS. 15A and 15B so as to obtain setting information necessary for creating a desired listing of television programs.

As described above, when the broadcast-program-information supplying program 300 detects a user operation on the customized-program-listing button 41 when the initial screen as shown in FIG. 8 is on display, the broadcast-program-information supplying program 300 creates a customized listing of television programs in accordance with the setting information described above, so as to let the personal computer 33 display the customized listing on the monitor display 34.

Although the present invention has been described with reference to particular embodiments, but is not limited to these embodiments. For example, the above embodiments have been described with respect to delivery of a listing of television programs. It is obvious, however, that the present invention can be applied to delivery of a listing of radio programs as well.

As described above, according to the present invention, the user can obtain a listing of broadcast programs with respect to a desired date and time in a similar format as the user can see in a newspaper. Since it is easy to change the database of broadcast programs, the user can access the most updated listing of broadcast programs at all the times.

Further, according to the present invention, the user can readily obtain a listing of broadcast programs falling into a category of the user's own interest, and can readily obtain a listing of broadcast programs which are searched for by specifying search conditions.

Also, according to the present invention, the user can obtain a listing of broadcast programs which has displayed contents indicated by the user.

Further, the present invention is not limited to these embodiments, but various variations and modifications may be made without departing from the scope of the present invention.

What is claimed is:

1. A device to send a listing of broadcast programs to a terminal device, comprising:
   a management unit to manage information about broadcast programs including broadcast date and time;
   a generation unit to extract broadcast information from said management unit and to edit the extracted broadcast information into a listing, which contains an identifier to locate actual contents of the broadcast programs;
   an addition unit to attach a date-change button to the listing, said data change button to change a date slot of the listing displayed on the terminal device to a user-specified date slot that is independent of a timing at which the date-change button is operated at the terminal device; and
   a sending unit to send the listing and the attached date-change button to the terminal device.

2. A device to send a listing of broadcast programs to a terminal device, comprising:
   a management unit to manage information about broadcast programs including broadcast date and time;
   a generation unit to extract broadcast information from said management unit and to edit the extracted broadcast information into a listing, which contains no identifier to locate actual contents of the broadcast programs;
   an addition unit to attach a time-change button to the listing, said time-change button to change a time slot of the listing displayed on the terminal device to a user-specified time slot that is independent of a timing at which the time-change button is operated at the terminal device; and
   a sending unit to send the listing and the attached time-change button to the terminal device.

3. A device to send a listing of broadcast programs to a terminal device, comprising:
   a management unit to manage information about broadcast programs including broadcast date and time;
   a generation unit to extract broadcast information from said management unit and to edit the extracted broadcast information into a listing, which contains no identifier to locate actual contents of the broadcast programs;
   an addition unit to attach a category-search button to the listing, said category-search button to display a listing of broadcast programs in a user-specified category that is independent of a timing at which the category-search button is operated at the terminal device; and
   a sending unit to send the listing and the attached category-search button to the terminal device.

4. The device according to claimed 1, further comprising:
   an activating unit to activate said generation unit to generate a listing of broadcast programs on the condition indicated by the date-change button.

5. The device according to claim 2, further comprising:
   an activating unit to activate said generation unit to generate a listing of broadcast programs on the condition indicated by the time-change button.

6. A device a defined by claim 3, further comprising:
   an activating unit to activate said generation unit to generate a listing of broadcast programs on the condition indicated by the category-search button.

7. A device to send a listing of broadcast programs to a terminal device, comprising:
   a management unit to manage information about broadcast programs including broadcast date and time;
   a generation unit to extract broadcast information from said management unit and to edit the extracted broadcast information into a listing, which contains no identifier to locate actual contents of the broadcast programs;
   an addition unit to attach a search button to the listing, said search button to search the listing displayed on the terminal device to find a user-specified broadcast program that is independent of a timing at which the search button is operated at the terminal device; and
   a sending unit to send the listing and the attached search button to the terminal device.

8. The device according to claim 7, further comprising:
   a second sending unit to send a search-condition setting form including a search span designation and a time slot to be searched to said terminal devices in response to operating said search button on said terminal devices.

9. The device according to claim 8, wherein said search-condition setting form includes a category designation to be searched.

10. The device according to claim 8, wherein the search-condition setting from includes a designation of one or more television stations to be searched.

11. A device as defied by claim 8, wherein the search-condition setting form includes a designation whether a search result summary is displayed or not.

12. The device according to claim 7, further comprising:
   a second sending unit to send a search-condition setting form including a search span designation and a category to be searched to said terminal devices in response to operating said search button on said terminal devices.

13. The device according to claim 12, wherein the search-condition setting form includes a designation of one or more television stations to be searched.

14. The device according to claim 12, wherein the search-condition setting form includes a designation whether a search result summary is displayed or not.

15. The device according to claim 7, further comprising:
   a second sending unit to send a search-condition setting form including a search span designation and one or more television stations to be searched to said terminal devices in response to operating said search button on said terminal devices.

16. The device according to claim 7, further comprising:
   a second sending unit to send a search-condition setting form including a time slot designation and a category to be searched to said terminal devices in response to operating said search button on said terminal devices.

17. The device according to claim 16, wherein the search-condition setting form includes a designation of one or more television stations to be searched.

18. The device according to claim 7, further comprising:
   a second sending unit to send a search-condition setting form including a time slot designation and one or more television stations to be searched to said terminal devices in response to operating said search button on said terminal devices.

19. The device according to claim 7, further comprising:
   a second sending unit to send a search-condition setting form including a category designation and one or more television stations to be searched to said terminal devices in response to operating said search button on said terminal devices.

20. A method for sending a listing of broadcast programs to a terminal device, the method comprising:

extracting information relating to broadcast programs from an information storage and editing the extracted broadcast information into a listing, which contains no identifier to locate actual contents of the broadcast programs;

attaching a date-change button to the listing, the date-change button to change a date slot of the listing displayed on the terminal device to a user-specified date slot that is independent of a timing at which the date-change button is operated at the terminal device; and sending the listing and the attached date-change button to the terminal device.

21. A method for sending a listing of broadcast programs to a terminal device, the method comprising:

extracting information relating to broadcast programs from an information storage and editing the extracted broadcast information into a listing, which contains no identifier to locate actual contents of the broadcast programs;

attaching a time-change button to the listing, the time-change button to change a time slot of the listing displayed on the terminal device to a user-specified time slot that is independent of a timing at which the time-change button is operated at the terminal device; and sending the listing and the attached time-change button to the terminal device.

22. A method for sending a listing of broadcast programs to a terminal device, the method comprising:

extracting information relating to broadcast programs from an information storage and editing the extracted broadcast information into a listing, which contains no identifier to locate actual contents of the broadcast programs;

attaching a category-search button to the listing, the category-search button to display a listing of broadcast programs in a user-specified category that is independent of a timing at which the category-search button is operated at the terminal device; and sending the listing and the attached category-search button to the terminal device.

23. A method for sending a listing of broadcast programs to a terminal device, the method comprising:

extracting information relating to broadcast programs from an information storage and editing the extracted broadcast information into a listing, which contains no identifier to locate actual contents of the broadcast programs;

attaching a search button to the listing, the search button to search the listing displayed on the terminal device to find a user-specified broadcast program that is independent of a timing at which the search button is operated at the terminal device; and sending the listing and the attached search button to the terminal device.

* * * * *

UNITED STATES PATENT AND TRADEMARK OFFICE
CERTIFICATE OF CORRECTION

PATENT NO. : 6,100,884　　　　　　　　　　　　　　　　　　　　　　　Page 1 of 1
DATED       : August 8, 2000
INVENTOR(S) : Yasumasa Tomita et al.

It is certified that error appears in the above-identified patent and that said Letters Patent is hereby corrected as shown below:

Column 15,
Line 42, change "a" to --as--.

Signed and Sealed this

Third Day of July, 2001

Attest:

NICHOLAS P. GODICI
Attesting Officer　　　Acting Director of the United States Patent and Trademark Office